Oct. 26, 1965 K. W. YOUNG 3,214,732
TIME DELAY STOP LIGHT CIRCUIT
Filed Sept. 7, 1962
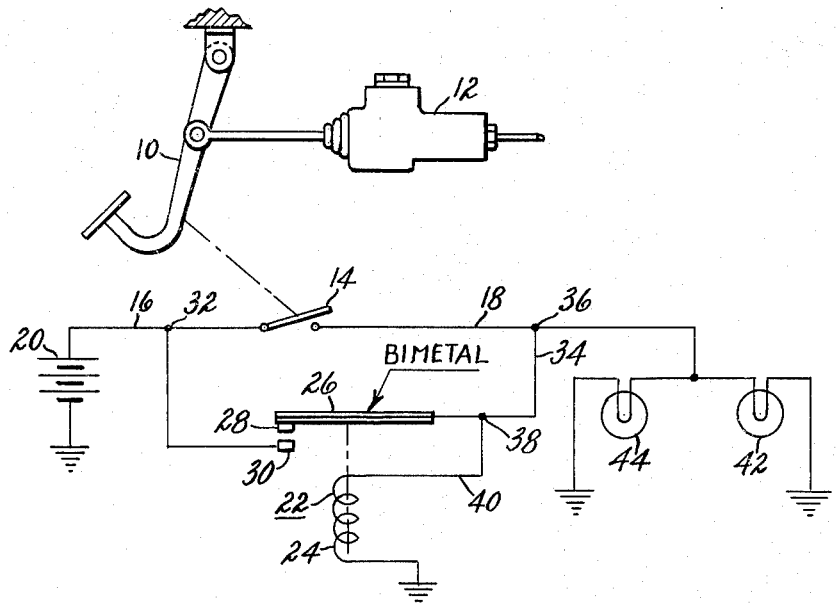
INVENTOR.
KENNETH W. YOUNG
BY C. R. Meland
HIS ATTORNEY

United States Patent Office 3,214,732
Patented Oct. 26, 1965

3,214,732
TIME DELAY STOP LIGHT CIRCUIT
Kenneth W. Young, Anderson, Ind., assignor to General Motors Corporation, Detroit, Mich., a corporation of Delaware
Filed Sept. 7, 1962, Ser. No. 222,108
5 Claims. (Cl. 340—78)

This invention relates to a stop light circuit for motor vehicles such as passenger cars wherein the stop lights are maintained energized for a short period of time after the initial energizing circuit for the stop lights is opened.

In present day passenger cars, it is common practice to energize the stop lights when the brake pedal of the passenger car is depressed to apply the brakes. The turning on of the stop lights operates as a signal for drivers of vehicles that the operator intends to stop or is at least slowing down. Where the brake pedal is depressed and maintained depressed, the stop lights are continuously energized indicating that the brakes are being applied. In some cases, the brake pedal is depressed and released in a rapid fashion as sometimes happens when the driver is pumping his brakes and the stop lights in a conventional system are then turned on and off. This is frequently confused as a turn signal indication and the driver following such a passenger car may take this signal to means that the driver intends to turn whereas in fact, the driver is pumping his brakes preparatory to a stop.

It accordingly is an object of this invention to provide a stop light circuit wherein the depression or actuation of the brake pedal will energize the stop lamps and these lamps are then maintained energized for a short period of time after the brake pedal is released. With this system, the stop lights are maintained continuously energized even though the brakes are pumped and no false turn indication is therefore given.

A more specific object of this invention is to provide a time delay stop light circuit wherein the stop lights can be energized directly through a brake operated switch and also through the contacts of a time-delay relay.

A further object of this invention is to provide a stop light circuit wherein the stop light circuit can be energized through a brake pedal actuated switch and through the contacts of a relay which is connected to provide a holding circuit for the relay through the contacts of the relay once the brake pedal actuated switch has been closed.

Further objects and advantages of the present invention will be apparent from the following description, reference being had to the accompanying drawings wherein preferred embodiments of the present invention are clearly shown.

In the drawing:

The single figure drawing is a schematic circuit diagram of a stop light circuit made in accordance with this invention.

Referring now to the drawing, the reference numeral 10 designates a brake pedal on a passenger car. The brake pedal is mechanically coupled with a brake actuating mechanism 12 which may be a power brake booster or a master cylinder. The brake pedal 10 operates a switch 14 connected between conductors 16 and 18. The switch 14 may be mechanically actuated by the brake pedal 10 or could be hydraulically actuated by pressurized brake fluid. In any event, the switch 14 is closed whenever the brake pedal 10 is depressed to apply the brakes for the passenger car or other type of motor vehicle and is open when the brake pedal is not actuated.

The conductor 16 is connected to one side of a source of direct current 20 which is shown as a battery. It will, of course, be appreciated that on passenger cars, the battery 20 is supplied with current from a generator which is not shown and that the conductor 16 would be connected with the positive side of the generator so as to derive power from the generator when the engine of the passenger car is operating.

A relay generally designated by reference numeral 22 is provided which has an actuating coil 24 and a bimetal armature or shiftable contact arm 26. The armature 26 carries a contact 28 which at times becomes engaged with the fixed contact 30. The relay 22 is of a type wherein the contacts 28 and 30 are normally disengaged, but will become engaged whenever the relay coil 24 is energized. This relay also is of a type wherein the current that flows through the contacts 28 and 30 and through the bimetal armature 26 will cause the bimetal to heat and therefore bow or distend to open the contacts 28 and 30 when a predetermined current has been flowing through the armature 26 for a predetermined length of time.

The fixed contact 30 of relay 22 is connected with junction 32 on the power conductor 16. The bimetal armature 26 is connected with conductor 34 which in turn is connected with junction 36 on the conductor 18. One side of the actuating coil 24 is connected with junction 38 on conductor 34 via the conductor 40. The opposite side of the actuating coil 24 is grounded as shown.

The conductor 18 feeds a pair of stop lamps 42 and 44, the opposite side of these lamps being grounded as shown. Only two stop lamps are illustrated, but it will be apparent to those skilled in the art that three or four lamps or any number of lamps could be used as desired.

When the operator of a passenger car desires to make a stop, the brake pedal 10 is, of course, depressed to actuate the brakes and to simultaneously close the switch 14. When switch 14 is closed, the stop lamps 42 and 44 are energized from power conductor 16, through the closed switch 14, through conductor 18, and through the lamps 42 and 44 to ground. When switch 14 is closed, the actuating coil 24 is energized from junction 36, through conductor 34, through junction 38, through conductor 40 and then through the actuating coil 24 to ground. This will cause the armature 26 to move to a position wherein the contacts 28 and 30 are engaged. A holding circuit can now be traced for the relay 22 which is from junction 32, through the closed relay contacts 30 and 28, through bimetal armature 26, through junction 38, through conductor 40, and then through the relay actuating coil 24 to ground.

It can be seen that if the brake pedal 10 is released, the switch 14 is opened but the circuit is still completed for the stop lamps 42 and 44 through the relay contacts 28 and 30. It is also seen that even though the switch 14 is opened, the relay contacts 28 and 30 are held closed by the relay holding circuit which is via conductor 40. The contacts 28 and 30 will open after the passage of a predetermined current through bimetal 26 for a predetermined length of time. This will then deenergize the stop lamps 42 and 44 and will of course deenergize the holding circuit for the relay. The time required for contacts 28 and 30 to separate depends upon the design of the relay 22 and also upon the number of stop lamps which are energized. This time delay can be varied by suitable design and will be tailored to the number of stop lamps to be used. When the bimetal arm 26 cools, it moves back to its normal position so that contacts 28 and 30 can engage when coil 24 is energized.

It will be appreciated that should the operator rapidly actuate and release the brake pedal 10 so as to pump the brakes, the stop lamps 42 and 44 are nevertheless maintained continuously energized so that a turn is not indicated to the driver that is following the passenger car. The stop lamps are not turned rapidly on and off since the relay 22 maintains a circuit for the stop lamps once the brake pedal 10 is depressed and the switch 14 closed.

It is pointed out that the false indication that might be indicated by a pumping of the brakes can be particularly aggravating where one of the stop lamps is burned out on one side of the passenger car and the other stop lamp is rapidly turned on and off as the brakes are pumped. This could indicate to the driver following the passenger car that a turn is intended rather than a stop.

It can be seen from the foregoing description that a time delay stop light circuit has been provided which can be readily applied to a conventional stop light system by simply adding the relay 22 to the system. The relay 22 is an inexpensive relay and therefore adds little cost to the entire system.

While the embodiments of the present invention as herein disclosed, constitute a preferred form, it is to be understood that other forms might be adopted.

What is claimed is as follows:

1. A stop light circuit comprising, a source of power, a stop lamp, a brake pedal, first switch means operated to a closed position when said brake pedal is depressed, means connecting said first switch means directly between said source of power and said stop lamp, and control means connected to be energized by said first switch means across said source of power, a second switch means connected in parallel with said first switch means, said second switch means being operable by said control means to complete a circuit between said power source and the said stop lamp when said first switch means is initially closed and maintaining said circuit closed for a predetermined length of time after said first switch means is opened.

2. The combination according to claim 1 where the control means includes a relay.

3. The combination according to claim 1 wherein the control means includes a relay having a bimetal armature.

4. A stop light circuit comprising, a source of direct current, a stop light, brake actuating means, a switch means closed when said brake actuating means is shifted to apply the brakes and opened when said brake actuating means is released, a circuit connecting one side of said source of direct current with one side of said stop light including said switch means, a control means having three terminals, said control means being operative to connect its first and second terminals when a voltage is applied between its second and third terminals, said control means being operative to open the circuit between its first and second terminals when a predetermined current flows between its first and second terminals for a predetermined length of time, means connecting said first and second terminals of said control means with opposite sides of said switch means, and means connecting said third terminal of said control means with one side of said source of direct current, said second terminal of said control means being connected with the side of said switch means which is connected with one side of said stop light.

5. A stop light circuit comprising, a source of direct current, a stop light, brake actuating means, switch means operable to a closed position by said brake actuating means, means connecting said switch means between said source of direct current and said stop light, a relay having an actuating coil and a pair of switch contacts, said switch contacts of said relay being normally open but being closed when said relay actuating coil is energized, means connecting said relay switch contacts in parallel with said switch means, and means connecting said relay actuating coil in series with said switch means whereby said relay actuating coil is energized when said switch means is closed to energize said stop light, said relay actuating coil being connected to one of said relay switch contacts whereby it is energized through said relay switch contacts when said relay switch contacts are closed, said relay including means separate from said actuating coil for opening said relay switch contacts a predetermined length of time after said relay switch contacts are closed.

References Cited by the Examiner
UNITED STATES PATENTS

| 2,513,712 | 7/50 | Combs | 340—66 |
| 2,876,432 | 5/59 | Gordon et al. | 340—81 |
| 2,924,817 | 2/60 | Dawkins et al. | 340—377 |

NEIL C. READ, *Primary Examiner.*